(12) United States Patent
Steichen

(10) Patent No.: US 7,496,567 B1
(45) Date of Patent: Feb. 24, 2009

(54) SYSTEM AND METHOD FOR DOCUMENT CATEGORIZATION

(76) Inventor: Terril John Steichen, 9814 McLearen Ct., Fairfax, VA (US) 22030

( * ) Notice: Subject to any disclaimer, the term of this patent is extended or adjusted under 35 U.S.C. 154(b) by 372 days.

(21) Appl. No.: 11/237,425

(22) Filed: Sep. 28, 2005

Related U.S. Application Data

(60) Provisional application No. 60/615,506, filed on Oct. 1, 2004.

(51) Int. Cl.
*G06F 17/30* (2006.01)
(52) U.S. Cl. .......................................... 707/3; 715/255
(58) Field of Classification Search ........................ None
See application file for complete search history.

(56) References Cited

U.S. PATENT DOCUMENTS

| | | | |
|---|---|---|---|
| 6,212,532 B1 | 4/2001 | Johnson | |
| 6,253,169 B1 | 6/2001 | Apte | |
| 6,327,581 B1 | 12/2001 | Platt | |
| 6,349,307 B1 * | 2/2002 | Chen | 707/103 X |
| 6,363,174 B1 | 3/2002 | Lu | |
| 6,446,061 B1 * | 9/2002 | Doerre et al. | 707/3 |
| 6,519,580 B1 | 2/2003 | Johnson | |
| 6,618,715 B1 | 9/2003 | Johnson | |
| 6,621,930 B1 | 9/2003 | Smadja | |
| 6,714,909 B1 * | 3/2004 | Gibbon et al. | 704/246 |
| 6,751,600 B1 | 6/2004 | Wolin | |
| 6,898,737 B2 | 5/2005 | Goeller | |
| 7,003,515 B1 * | 2/2006 | Glaser et al. | 707/5 |
| 7,146,361 B2 * | 12/2006 | Broder et al. | 707/5 |
| 2003/0130993 A1 * | 7/2003 | Mendelevitch et al. | 707/3 |
| 2004/0019601 A1 | 1/2004 | Gates | |
| 2004/0064464 A1 | 4/2004 | Forman | |
| 2005/0108200 A1 * | 5/2005 | Meik et al. | 707/3 |
| 2005/0251510 A1 * | 11/2005 | Billingsley et al. | 707/3 |

\* cited by examiner

*Primary Examiner*—Pierre M Vital
*Assistant Examiner*—Sheikh M Kabir

(57) ABSTRACT

The present invention provides methods and systems for automatic categorization of documents. More specifically, the present invention provides for the automatic assignment of a set of pre-defined topics to a set of documents.

4 Claims, 6 Drawing Sheets

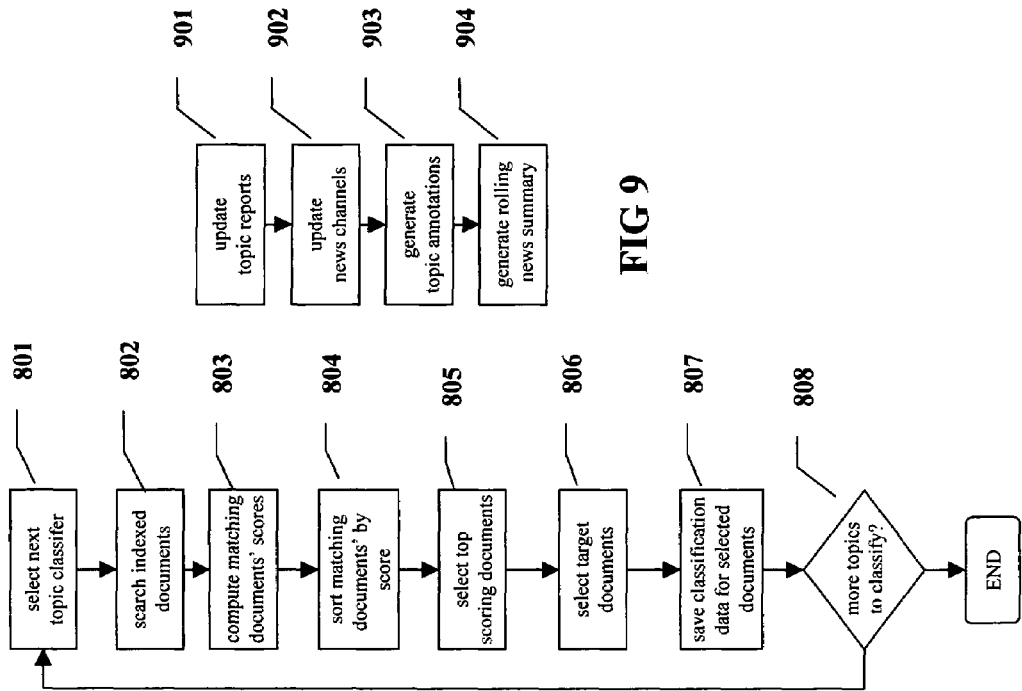
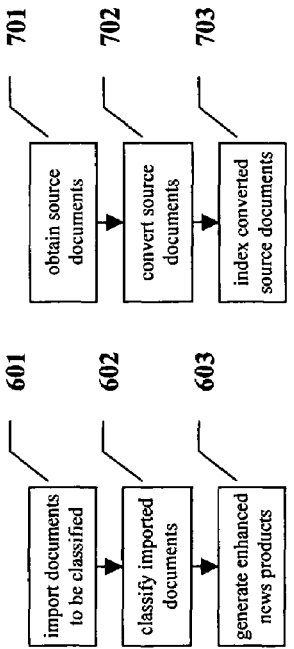
FIG 9
FIG 8
FIG 7
FIG 6

SYSTEM AND METHOD FOR DOCUMENT CATEGORIZATION

CROSS-REFERENCE TO RELATED APPLICATIONS

This application claims the benefit of provisional patent application Ser. No. 60/615,506, filed 2004 Oct. 1 by the present inventor.

BACKGROUND OF THE INVENTION

1. Field of the Invention

The present invention generally relates to the field of automatic document categorization.

2. Prior Art

While the present invention has application to a wide range of different environments, the preferred embodiment is directed towards online newspapers. The principal product of online newspapers—current news reports and current news articles—has become a commodity. To many users, a given online news site's rendition of today's news events is essentially interchangeable with that of any other site. Thus the publishers' leverage is limited, regardless of the quality of reportage.

This situation suggests the existence of major opportunities for the development of unique and valuable news products. Based on extensive market research, the greatest opportunity appears to be in the development of content products that center on the news, rather than in products and services that are more peripheral to the main activity of news sites. This allows sites to focus on their core competencies.

News sites excel at publishing reports of current news, and with the rapid growth in the number of such sites, competition has become fierce. More important, news consumers have become overloaded—there's simply too much news out there to properly absorb. Equally important, consumers are inundated with constantly changing reports of news events, to the point that they are nearly desperate for some kind of context to help them better understand the significance of these events.

As a result, context is often at least as important as content. If a publisher can add a meaningful context to existing content, significant additional value can be generated for the content-plus-context combination. If the publisher were to provide a context in the form of a report that is related to, for example, abortion, and it's basic form is a list of abortion-related articles, the initial appearance of the list—consisting mainly or exclusively of article headlines and summary paragraphs—contributes to the value of the entire collection.

Of all the potential news-centric products, the ones with the most potential for competitive differentiation, all depend on the existence of a news classification or categorization capability.

However, actually achieving effective categorization in a news environment requires overcoming some major challenges. To begin with, (1) there are a large number of topics—generally several hundred or more—that are required to categorize typical news stories at a reasonable level of detail. Also, (2) many of these topics are fairly close in definition—for example, in Iraq, there are topics relating to the occupation, to the oil reserves, to doing business in Iraq, to media issues, etc.

In addition, (3) the categorization must be accomplished in near real time. Typically, well over 200 articles must be categorized each day, often within a period of an hour or less. Plus, (4) new topics are constantly being added, and existing topics being redefined—single topics expanded into multiple topics, multiple topics merged into a single topic, and even more frequently, the definition of topics are simply refined.

And, finally, it is essential that (5) error rates be kept very low. False positive errors (relating to what's called "precision") are particularly egregious, creating a lack of confidence in the overall news report. Similarly, though somewhat less detrimental, are false negative errors (relating to what's called "recall"); too many and users lose confidence that the system is covering all the news events of importance and relevance. Some types of errors are more noticeable in (very dynamic) daily news reports, while others become more prominent in news reports (more static in nature) covering a longer period of time.

The state of the art in the technology (which is generally referred to as automatic text categorization/classification) is advancing strongly, and the application of this technology to processing news articles has become a high priority. Manual classification is out of the question, given the large number of categories, the large number of new articles that must be classified, the near real-time nature of the required response, and the demand for classification consistency and accuracy.

Rule-Based Text Categorization

Initially, text categorization technology focused on rules-based approaches, which are similar to the query-based technology found in search engines. Employing queries provided by users, the search engine analyzes processed articles (usually stored in the form of indices), performing Boolean logic matches between the query's terms and the content terms in the processed articles.

Using rules-based technology in searching, a query is developed and manually refined until it retrieves precisely the documents desired. To effectively use conventional search technology for text categorization, a mechanism for storing and retrieving the query expressions (often referred to as "canned searches") is required.

Once the query has been tested and refined, the documents are typically correctly included or excluded. But over time, a growing number of documents inevitably become incorrectly classified; they are either incorrectly included (false positives) or excluded (false negatives). This means that the output of even the most refined query must be constantly monitored to detect when errors begin to become significant. This monitoring can require a very substantial and costly effort.

The improperly classified documents could be, as appropriate, included or excluded by adding an include/exclude reference modifier to the query. With this approach, however, the augmented query (with a growing set of exclude/include conditions appended to it) quickly becomes very unwieldy. Once that happens, the query must be reformulated and tested and refined all over again so that it once again accurately captures the proper set of documents. Unfortunately, every time a query is refined, the whole set of not only current, but also past documents it retrieves must be manually re-examined and verified.

Instance-Based Text Categorization

To address these serious limitations of rule-based classifiers, a more advanced form of automated text categorization technology emerged, which is often called an "instance-based" or "machine learning" approach. Using the instance-based approach, the classifier analyzes a collection of documents that have been previous determined to belong to specified categories, and it develops an internal representation of the collection for each category. In essence, the instance-based classifier distills the common thread of meaning shared by the collection.

The instance-based classifier then compares new articles or documents against this internal collective representation (the "instance") to determine whether the new article is related to this particular collection (characterized by a topic). A variety of different algorithms are employed, but they all have the common effect of computing how close the article being analyzed relates to the specific pre-classified collection. The most common learning-based algorithms include nearest-neighbor, neural nets, decision trees, naive Bayesian and structured vector machines.

A major problem with instance-based classifications, even though it is more advanced compared to rules-based technology, is that it presents a kind of Catch-22. Before categorization of new documents can proceed, there must exist and be available, a set of documents that have been previously (and accurately) categorized against each topic. The presumed existence of this "training corpus" begs the question of how it was arrived at in the first place.

Moreover, every time a new topic is introduced, a new training corpus must be obtained.

And, every time an existing topic is changed (a fairly frequent event in the news business) the previous training corpus must be discarded and replaced with a new collection of "training" documents that have been pre-classified to reflect that new topic definition.

The performance of instance-based automated text categorization strategies tend to drop significantly when the number of topics grows and, in particular, when the topic definitions become too similar (as is common with news-related topics). And finally, such technology tends to be computationally expensive and slow.

Text Categorization Performance

Regardless of the technical implementation used, classification system performance is most commonly defined by two parameters: precision and recall. Precision refers to the capability of the classification system to avoid mistakenly assigning a topic to a document unrelated to that topic. Recall refers to the capability of the classification system to identify all documents that are in fact related to the topic. Combined, precision and recall characterize the overall accuracy of the classification system.

Though a given classification system configuration will produce results with a specific precision and recall measurement, the levels of precision and recall can be adjusted by adjusting the classification system's configuration. Precision and recall are generally inversely related. As the classification system' configuration is changed, the precision/recall performance will typically follow a curve similar to that shown in FIG. 1. At the midpoint 102, precision and recall are approximately equal. At the lower point 103, recall has increased at the expense of precision, while at the upper point 101 precision has increased while recall has diminished.

Each classification system will produce its own precision-recall curve. Referring to FIG. 2, a simple rule-based system will have a performance curve 201 that is generally lower than the performance curve of an instance based system 202. If a more complex, structure-aware rule-based system, or an instance-based system with a larger training set, is employed, their performance curve 203 will generally show a greater performance.

The preferred embodiment of the present invention has as its aim to generate enhanced news content products based on the classification of news articles. Research conducted in support of this embodiment strongly suggests that for the enhanced news products to be acceptable to their intended market audiences, the classification of the news articles must be extraordinarily accurate. Specifically, this research suggests that the precision level should be greater than 99%; that is, less than one out of each hundred news articles is incorrectly classified. That same research suggests that the target recall should be greater than 97%.

Evaluation of existing automated document classification systems concluded that none of them were capable of achieving those levels of precision and recall, particularly on a sustained basis. As shown in FIG. 3, this gave rise to the present invention whose performance curve 304 not only exceeds the performance of prior art classification systems 301-303, but is sufficient to operate in the performance region 305 defined by the 99% precision and 97% recall goals.

Beyond precision and recall, there are other important factors that affect the practical usability of a classification system in different environments. These additional factors, which are explained in more detail below, include:

1. provision for multiple classifications;
2. provision for classification confidence levels;
3. preparation or training speed;
4. (for learning-based classifiers) sensitivity to training corpus errors;
5. ease in changing or adding a classification topic;
6. ease of detecting and correcting classification errors; and,
7. classification throughput.

Multiple classifications (1) refer to the capability of assigning more than one topic to a given document. This is an essential capability for many applications. However, when multiple classifications are supported, the classification system is well served by a method of assessing the significance of each of the multiple classifications. Such a method is the provision of confidence levels (2).

Confidence levels are relative indicators on the confidence that can be placed on the decisions of the classification system. Confidence levels typically from 0.0 to 1.0 inclusive, with 0.0 indicating the lowest confidence level and 1.0 representing the greatest confidence. Most classification systems do not provide confidence levels associated with the classification outcomes.

Preparation or training time (3) refers to the time necessary to generate the classifiers using either rules or training data.

When employing learning-based classification systems, a significant factor pertains to the amount of errors in the training data (4) used to generate the internal classifiers. Deficiencies in training data produce "noise" in the resultant classification decisions that can be sufficient to seriously detract from the performance otherwise achievable by the classification system.

In applications where the topic set upon which the classifications are made, changes frequently, the classification system's ability to adapt to such changes (5) can become critical. In the preferred embodiment, the flow of newly published news articles can overwhelm classification systems designed for more static environments.

Ease of identifying and correcting errors (6) refers to the capability for monitors, human or machine, to determine that a classification error has occurred, and the capability to make corrections that not only change the specific error, but that prevent it from occurring again in the future.

Classification throughput (7) refers to the capability of a classification system to process the volume of documents it is presented with.

Thus, for the reasons set forth above, the standard classification systems aren't well suited for many applications, such as classifying news articles. What is needed is a classification system that is far more accurate (with a precision about 99% and a recall above 97%), which can make multiple classification assignments for each document, and which can easily adapt to changes in topic definitions as well as adding new topics.

OBJECTS AND ADVANTAGES

Accordingly, several objects and advantages of the invention are:
  a. to provide a document categorizer that is exceptionally accurate; sufficiently so that it can be used, among other purposes, to generate cross-references between current news articles and background information on topics pertinent to such articles, with a consistent precision level exceeding 99% and a consistent recall level simultaneously exceeding 97%;
  b. to perform classification involving hundreds of different, often closely-related topics, in a brief period even when using ordinary computers in the class of standard personal computers;
  c. to easily accommodate changes in the topic set, either by new topics being added, existing topics being merged with other existing topics, existing topics being combined with other existing topics, modification of existing topics, and removal of existing topics;
  d. to perform classification without the need for sets of pre-classified training documents, and thus avoiding the difficulty of accessing such documents, and incurring the errors that may have occurred in the original classification of the training documents;
  e. to perform rule-based classification in a manner that allows the classification features of the rules to be persistent, changing little when new documents are added to an existing classified document repository;
  f. to perform classification in which each document may be associated with multiple topics, and in which each document-topic association is also assigned factor representing the strength of the association; and,
  g. to provide a means to quickly determine the presence of errors and to quickly fix them so subsequent classification actions don't produce the errors.

Further objects and advantages will become apparent from a consideration of the ensuing description and drawings

BRIEF SUMMARY OF INVENTION

The present invention accomplishes these objects by providing a bimodal classifier, which consists of a rule-based first stage, followed by a "relevance screen" second stage. The bimodal classifier employs a sophisticated version of a rules-based screening for an initial selection of matching documents, and then applies a relevance-based selection.

BRIEF DESCRIPTION OF DRAWINGS

FIG. 6 illustrates the highest-level overview of the preferred embodiment operation.

FIG. 7 shows the operation of the document importing process.

FIG. 8 depicts the operation of the classification process.

FIG. 9 shows the operation of the enhanced product generation process.

DETAILED DESCRIPTION OF THE INVENTION

Figure 1:
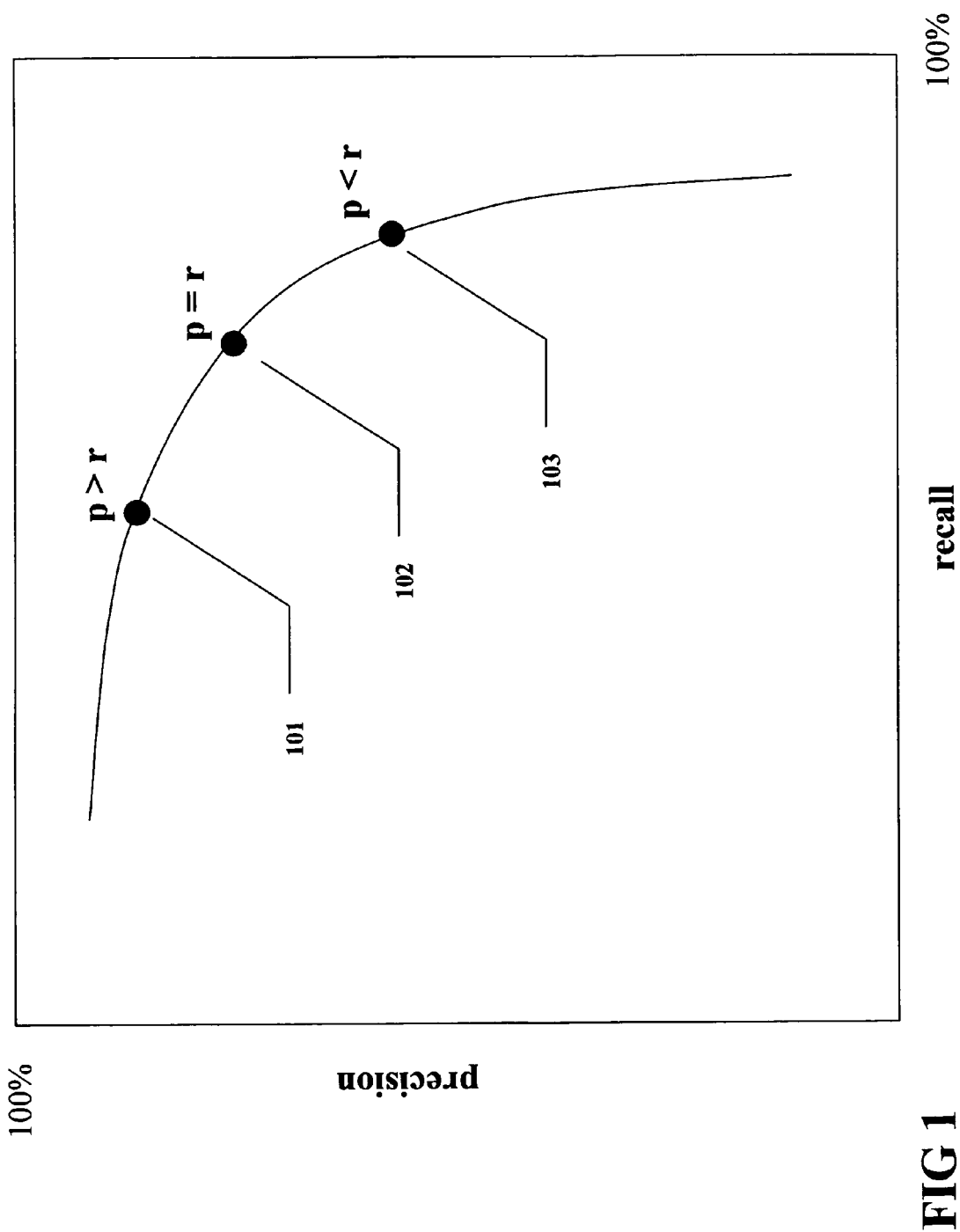
FIG. 1 shows a typical automatic categorization performance curve relating precision and recall.
Figure 2:
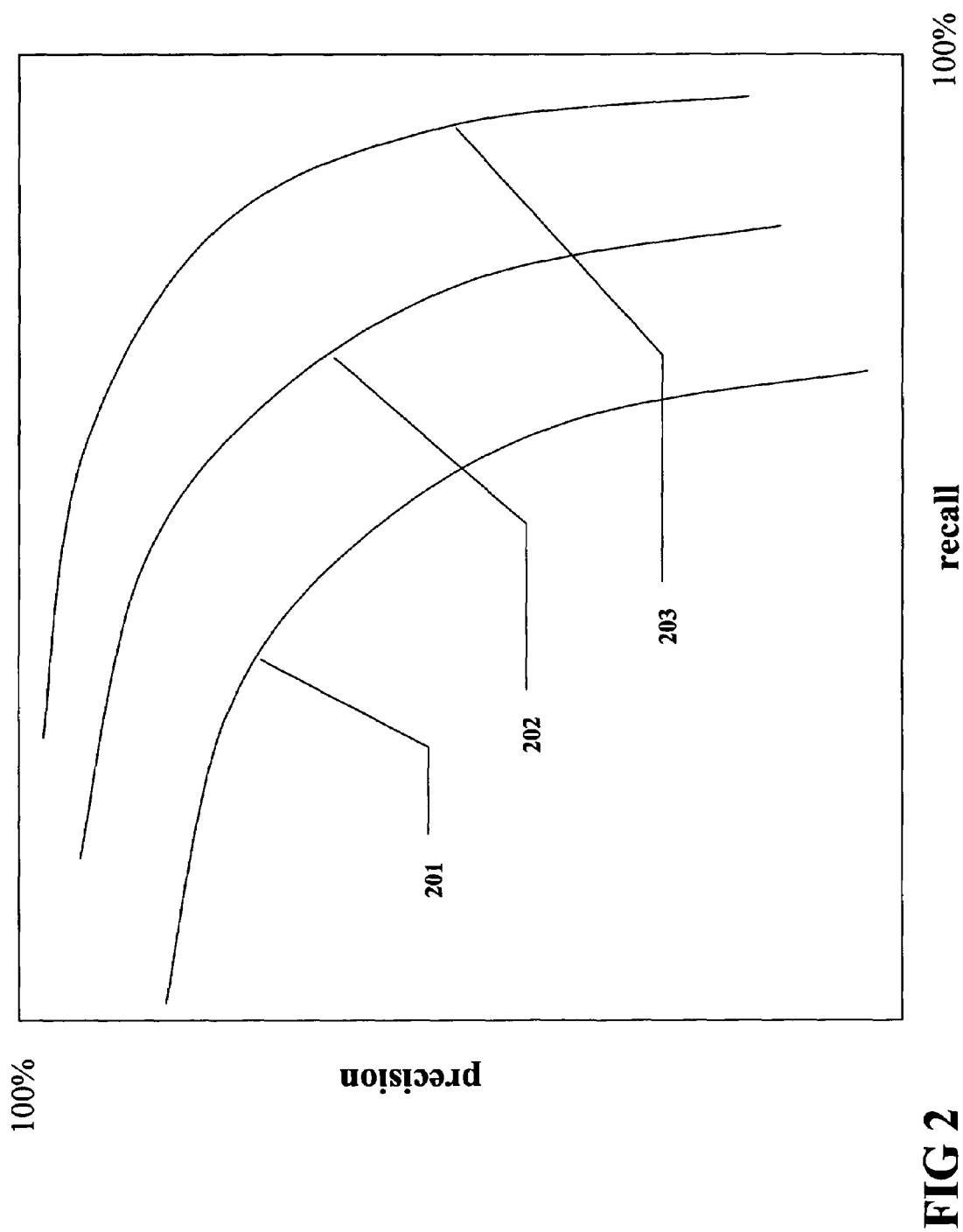
FIG. 2 shows typical automatic categorization performance curves for different forms of categorization systems.

The present invention includes several key characteristics including (a) structure-aware searching, (b) similarity-based relevance scoring, and (c) structure-based relevance boosting.

Structure-Aware Searching:

This approach takes advantage of a characteristic of some documents such as news articles in which a topic reference in the headlines is likely to be more significant than ones in the sub headline, which is more significant than one in the article summary, which is more significant than one elsewhere in the article.

The inventive system uses search engine technology that's sophisticated enough to differentiate between these parts (headline, subhead, etc.) of the article.

The inventive system also takes advantage of the fact that some documents such as news articles often include metadata added by the publisher, such as general categories and topic tags, location within the publication (section, page), publication date, and the like. This publishing metadata is also accessible by the search engine.

The technology used in rule-based text categorization is similar to, and based on, information retrieval technology used in the common search engines (though in a more sophisticated form than found in most such search engine software). The main obvious difference is that a text-categorization rule is stored and retrieved by a computer, rather than composed and entered by the human user. Thus, one can think of the rule-based approach as being based on the use of stored or canned search engine queries.

Searching via a query involves first constructing an index, which organizes the content of the indexed documents into a more readily usable form. The search then employs Boolean matching between the terms of the query and the terms contained in the index. Desired documents can, to some degree, be separated from undesired documents using a query that's carefully "tuned" to take maximum advantage of the documents' structure.

Similarity Scoring:

Some of the more advanced search engines are capable of computing a score to reflect the similarity (or closeness of match) between each matching document and the query used to select it. While the scoring formulae are often quite complex, the general result is that the more matches found between the terms in the query and the terms in the index, the higher the score. Note that this similarity score is not the same as the relevancy scoring used by popular web search engines, such as Google and Yahoo. What typical web search engines use is more a link popularity score than a content similarity score.

Relevance Boosting:

The most sophisticated search engines can take scoring a step further. Depending on where the matching terms are found in the documents, the similarity score may be adjusted (boosted). As mentioned above, matches that occur within the headline are more significant (get a larger boost) than those in the article's body.

Applying such structure-sensitive scoring adjustments yields a certain degree of discrimination. That is, the similarity scores of more relevant documents will tend to be higher because of this. However, that still leaves the possibility that sometimes significantly less relevant (and sometimes inappropriate) documents will still qualify as "matching." Because the results are almost always displayed in reverse chronological order, these mismatches will often show up early in the listing, where they are readily apparent to users as errors.

A Bimodal Approach:

The solution is to broaden the scope of the query and simultaneously restrict the results to the most relevant, and then, finally, sort them in reverse chronological order. This way the undesired (but still matching) documents will be eliminated.

In the inventive system, the cutoff threshold is called the "relevance screen" and is defined in terms of either the total number of relevant documents to be considered, or the total percentage of documents to be considered. For example, assume that the query for a specific topic returns 500 matching documents. The relevance threshold might be set to 350 (or 70%). That means that the lowest 30% of matching documents will be discarded, while the remaining 70% will be returned, in proper chronological order.

Using this approach, as more documents are added to the repository, those with high relevance are automatically included while lower relevance documents are ignored. After such a query is defined (or refined, as the case may be), the results may be examined and refinements made. As more new documents are added to the searched repository, additional adjustments will often need to be made. Over time, however, the need for additional adjustments will diminish and the categorization performance will become stable.

The effect of this approach is that, as time goes on, the rate at which new topics must be added decreases, and the rate of adjustments needed also diminishes. Periodic monitoring is still necessary, but with less and less need to make changes. Experience in applying this approach to the news articles published by a major newspaper, shows that the false positive error rate stabilizes at around 2-3% and the false negative error rate stabilizes at around double that. These error rates are significantly below those achievable with conventional automated text categorization technology, and well within the acceptable range for this purpose.

Thus the core of this invention lies in adding relevance thresholds to queries using a structure-aware search mechanism that provides true (query-to-document) relevance scoring. Besides being (a) structure-aware, the other essential characteristics of the search engine technology needed to support this inventive system include the capability to handle: (b) multiple word and phrase terms, (c) wildcards, (d) term nesting (usually with parentheses separators), (e) and/or/not operators, (f) similarity (between each document and the query) scoring, and (g) relevance boosting. This last capability, relevance boosting, refers to the capability to adjust the computed similarity score by specific amounts depending on what field is involved. The adjustment factor may be specified at the time of initial document processing/indexing, and/or as part of the query expression itself.

The reason that such a powerful yet conceptually simple enhancement had not emerged earlier stems largely from the fact that research and development in automated text categorization has evolved away from rule-based solutions, in favor of instance-based approaches. Most researchers in automated text categorization technology consider the limitations of rule-based approaches (described earlier) to be so severe that these approaches don't hold much potential.

Reinforcing this lack of interest in rule-based solutions is the fact that rule-based approaches are based on a different field of research, that of information retrieval, or search engine, technology. The preponderance of such search engine development is heavily focused on interactive querying by human beings, rather than non-interactive querying by computer (which is what characterizes most text categorization processing). The human being is expected to be able to scan the returned results and manually sift through the irrelevant matches to locate those that have most meaning.

Assumptions of this type of behavior are reasonable for human users, but not for computerized operations. Human beings tend to use far less complex queries than are needed for rule-based text categorization, with little attention to structure-awareness or structure-based "tuning" of relevance. And, search engines have increasingly replaced the notion of relevance as query-to-document similarity, with relevance as link popularity. Such measures of link popularity have little if any value in text categorization.

Finally, the kind of sophisticated queries needed to precisely differentiate between different topics and concepts tend to make heavy use of mechanisms such as wildcards and complex nesting. Such queries are generally discouraged or forbidden by standard search engines because they requires substantially greater computational overhead than is practical for most web operations. The preferred embodiment allows documents to be included or excluded by adding and indexing a topic-specific inclusion/exclusion code to the document itself, rather than incrementally extending the query itself, as discussed earlier relating to rule-based classifiers. For example, let's assume that we have a document that isn't captured by the query for topic_x, but which is related to topic_x. It may be that adjusting the topic_x query will have such negative consequences that we can't take that approach. Using the preferred embodiment, a user can simply add a topic_x inclusion code to the document's metadata (causing it to also be inserted into the index). The way that all topic queries, including topic_x, are constructed, they automatically include any documents that happen to include their inclusion code (and exclude those that may have their exclusion code, regardless of the raw matching characteristics).

To assist in understanding the present invention, the following definitions have been adopted:

A topic classifier consists of a unique topic code or identifier, a topic description, a topic query and a topic threshold. Other information may optionally also be included in a topic classifier.

A topic query is a structured query expression focused on a specific topic. It is designed for use by a searcher to identify documents that relate to that topic.

A structured query expression is a standard query expression that allows query terms to be associated with specific parts of a document.

A standard query expression is comprised of one or more query terms and zero or more Boolean operators.

A Boolean operator may be of the form of OR, AND, or NOT.

A wildcard can represent either any single character, or zero or more characters.

A query term is comprised of a word or a phrase, or a collection of other query terms.

A document selector is a structured query expression designed to allow the searcher identify the set of documents to be classified. In one embodiment, the document selector is combined with the topic query using a logical "AND" operator. Normally, the document selector is designed to select a set of documents corresponding to the most recently imported source documents. There are cases, however, when the document selector is used to select some other set of documents. In the preferred embodiment, document characteristics such as publication date and an associated value for the publication date represent criteria, which when included with appropriate query syntactical elements, becomes the document selector.

A topic threshold is a number representing a proportion of sorted documents to be extracted. In the preferred embodiment, the topic threshold is expressed as a percentage, ranging from 0 to 100. However, it can optionally be expressed as a whole number representing a specific number of matching documents.

A similarity score is a number that represents the degree to which the content of a document is similar to the set of query terms contained in a topic query. In the preferred embodiment the similarity is computed using a cosign function of document term vectors. It is understand, however, that a wide range of alternative algorithms can be used to compute document similarity scores.

A structure-aware index is an index in which the contents of included documents are identifiable as to their location in the document's structure.

A structure-aware search engine is a search engine that uses structured query expressions.

A search engine identifies documents that match the query terms and logic contained in a query expression.

A classification record is a set of information comprising a unique identifier of the classified document, a unique identifier of the associated topic, the document selection criteria, the document's similarity score and rank, and the index of the ordered documents. Other information might optionally be included in the classification record. In the preferred embodiment, the classification record is stored in a classification database. Optionally, it could be stored elsewhere, including within the associated internal standard document.

A classification database is a collection of classification records.

The present invention may be practiced as a system or as a method. The preferred embodiment of the present invention classifies news articles against a set of news-related topics. The set of classified news articles is then used as the basis for producing a set of enhanced news topics.

The news articles are imported into the classification processor. Using the set of topic classifiers, the classification processor then analyzes each article and assigns zero or more of the target topics to that article. Each such assignment of a topic to a document constitutes a classification, and each such classification includes a reference to the topic, a reference to the document, and a confidence factor.

These news articles with their associated classifications are then used to generate enhanced news products.

Figure 4:
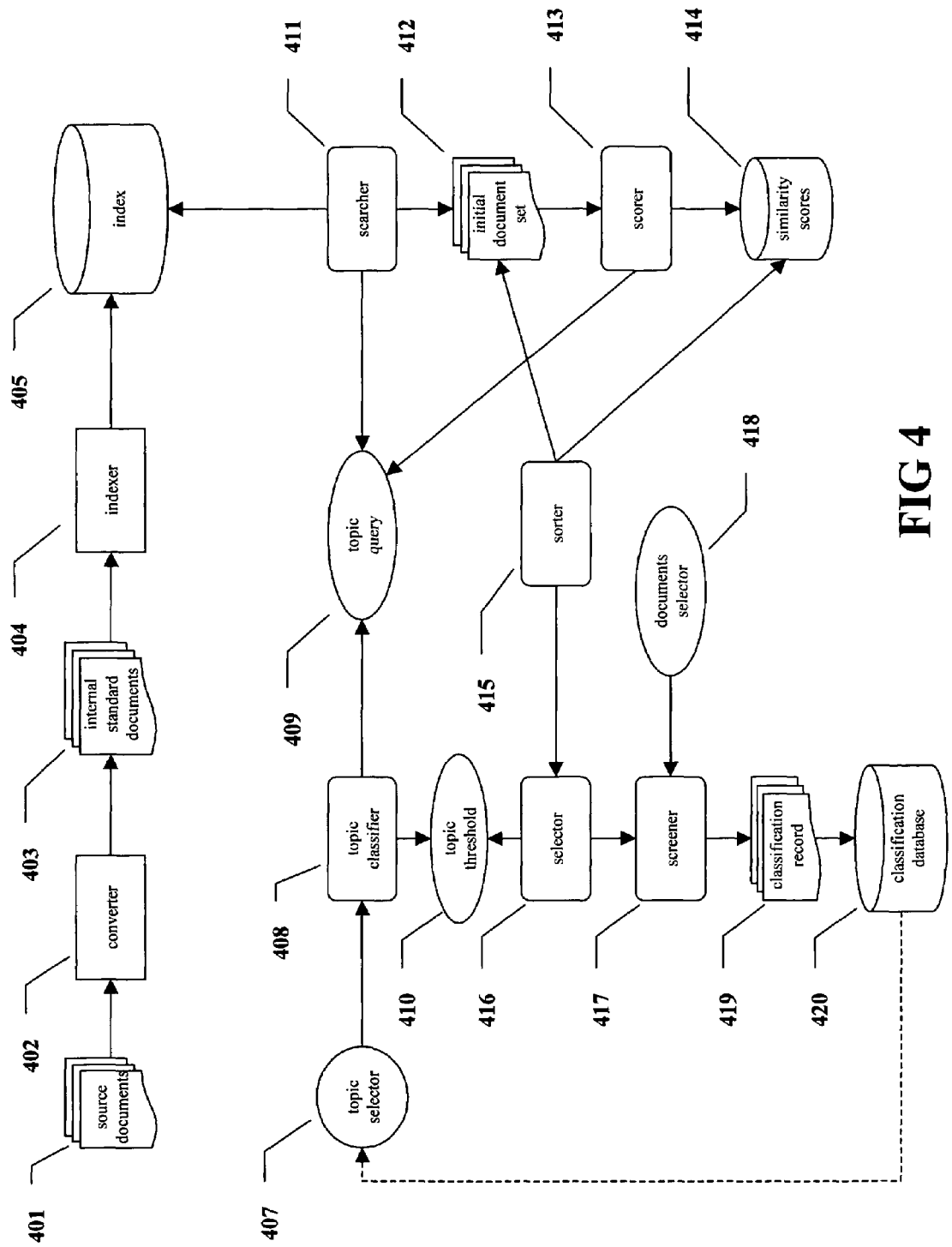
FIG. 4 shows the components of the preferred embodiment of the present invention.

Referring to FIG. 4, source documents 401 to be classified are first converted by the converter 402 into standard internal documents 403. Each source document publisher often formats documents in a publisher-specific manner. It is the job of the converter 402 to locate and extract the relevant content from the publisher-formatted source documents 401 and use that content to instantiate corresponding standard internal documents 403. The converter 402 not only extracts specific information, but also, where needed, converts publisher-specific syntax to the standard syntax used in the standard internal documents 403.

The indexer 404 then processes the standard internal documents 403 to produce an index 405. In the preferred embodiment, these new documents are merged into the index containing any documents that have been previously indexed.

Based on the desired topic, topic classifier selector 407 selects the appropriate topic classifier 408. The searcher 411 then uses the topic classifiers topic query 409 to search the index 405 and identify the initial matching document set 412. In the preferred embodiment, the topic selector 407 optionally identifies either a single topic, or sequentially identifies each of the available topics, in which case steps 407-420 are repeated for each selected topic.

In the preferred embodiment, the searcher 411 is capable of handling a wide variety of different types of queries. While even the simplest query expression will work, the more precise the query expression, the better the overall classification accuracy. The searcher supports a broad range of query expression features, including phrase and word terms, field modifiers (to limit the matching of a term to the contents of a particular field), Boolean operators (AND, NOT, OR), wildcards, term grouping, and proximity operators. In addition, it supports compile-time, index-time or query-time directives to alter the similarity score computed by the scorer.

The standard internal document structure used in the preferred embodiment includes separate fields for headline, subhead, summary, body, author, category, slug, date, length, and topic codes. The topic query expression can reference any of those fields. For example, a topic query expression might be:

+(headline:terma subhead:terma summary:terma)+ category:catx.

This expression declares that for the searcher 411 to consider an examined document from the index 405 to be matching, the term 'terma' must be present either in the headline, subhead or summary, and the document must have an internal categorization of 'catx' (usually supplied by the news publisher).

The scorer 413 then computes the similarity scores 414 for each of the documents in the initial document set 412. In the preferred embodiment, the similarity computation is based on a cosine algorithm applied to document term vectors; other embodiments can use other algorithms instead.

The sorter 415 organizes the documents in the target document set 412 according to the computed similarity scores 414. It then passes the results to the selector 416, which uses the topic threshold 410, which is a component of the topic classifier 408, to identify the documents in the initial document set 412 which have the highest similarity scores 414.

The screener 417 retrieves from the documents outputted by the selector 416 only those documents matching the criteria of the document selector 418. In the preferred embodiment the criteria used is the documents' publication date, but any other document characteristic could alternatively be used. It is understood that there may be one or more documents selected by the document selector 418. For each selected document the screener 417 extracts data and uses it to create a classification record 419 for each such document. In the preferred embodiment, the operation of the screener 417 follows the operation of the selector 416 and scorer 413. It is recognized that in other embodiments the operation of the screener 417 might occur before that of the selector 416 or scorer 413.

The classification record 419 contains, as a minimum, three items of information: a unique topic identifier, a unique document identifier and the similarity score. In the preferred embodiment, the document selection criteria found in the document selector 418, the document's rank, and the total number of documents matching the topic query are also included in the classification record. In the preferred embodiment the classification record is then inserted into the classification database 418. Alternatively, the classification record information might be saved elsewhere or included in the associated standard internal document itself.

Figure 5:
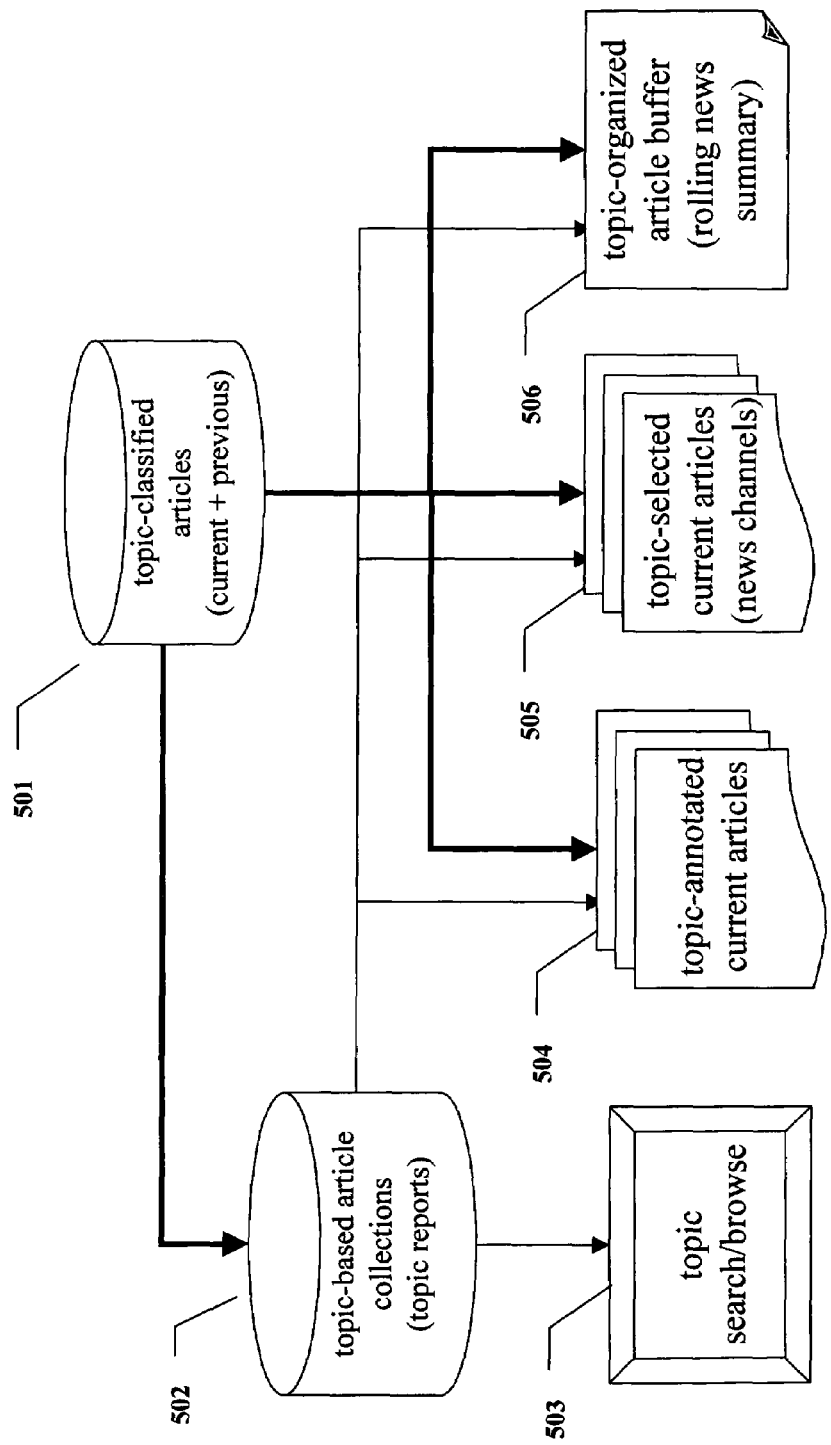
FIG. 5 depicts the enhanced news products produced by the preferred embodiment of the present invention.

FIG. 5 shows the enhanced news products generated by the preferred embodiment of this invention. It is understood that these specific products are only a few of a much larger set of news products that the invention can be used to produce. The classification process just described has generated the topic-classified articles 501. Though the articles and the classification database (FIG. 4, 418) may be physically separate, they may also be combined. Conceptually, the articles and classifications comprise a set of topic-classified articles 501.

Topic reports 502 are one form of enhanced news product produced from the classified articles, and form the building block of the other products. For each topic employed in the classification process (selected by the topic selector shown at FIG. 4, 407) a topic report is produced. The topic report includes a list, normally displayed in reverse chronological order, containing references to articles that have been classified with the associated topic. Other information and links to information pertaining to the topic may be included in the topic report 502. The information in each topic report provides viewers with a context of information pertaining to the topic.

Many topic reports 502 may exist. To assist online news consumers 507 in accessing these reports, a topic search/browse interface 503 is provided.

Another form of enhanced news product is a news channel consisting of topic-selected current news articles 505. As new articles are processed and associated with a given topic, reports identifying these articles are sent to individuals who have expressed an interest in articles relating to that topic. The reports may be in the form of e-mails, RSS pages, or other forms. The news channel provides subscribers with news filtered by the topic associated with the news channel.

Topic-annotated news articles 504 form another enhanced news product. News articles that have been classified as pertaining to a given topic are modified to include links pointing to the associated topic report. An article may have zero or more such topic links, depending on how many topic assignments have been made to it. All topic links have a label that identifies the topic as well as a confidence factor indicating the strength of the relationship between the article and the topic. Besides or in lieu of being inserted into the articles themselves, the associated topic links may be displayed in proximity to references to the article in news reports. The topic-annotated news articles and reports provide viewers with links that provide context and background pertinent to the associated article.

A running news summary or topic-organized article buffer 506 is yet another form of enhanced news product. For a specified interval of time, often a week, news article classifications are analyzed to determine which topics have been related to the greatest number of articles. A report is then prepared, in which the most popular topics are listed, along with references to the articles assigned that topic. The running news summary 506 provides viewers with a quick way to catch up with the news.

FIG. 6 shows an overview of operation of the system described in FIG. 4. Subsequent figures show details of its steps. The first step 601 is to import the source documents into an internal form suitable for further processing. The internal details of step 601 are discussed later and illustrated by FIG. 7.

In step 602 classifications are made to the selected documents by forming associations between a set of pre-defined topics and the individual documents. The internal details of step 602 are discussed later and illustrated by FIG. 8.

Using the documents classified in step 602, new and enhanced content is generated as shown in step 603. The internal details of step 603 are discussed later and illustrated by FIG. 9.

FIG. 7 shows the detailed steps of the importing process. The source documents are obtained as shown in step 701. In the preferred embodiment the source documents are online news articles. However, it is understood that source documents can be of other types as well, and may contain text, as well as graphics, audio, video and other media elements.

At step 702 the source documents are converted into a suitable internal format. The content of each source document is extracted and then inserted into an appropriate location in a corresponding standard internal document. The creator or publisher of the source document typically defines the syntax found in the source documents. That syntax is then converted into a suitable, standard internal syntax such that the standard syntax is the same for all internal standard documents, regardless of the creator or publisher of the corresponding source documents.

In step 703 the converted documents are indexed, a process by which terms are extracted from the documents and stored in a structure called an index, in a manner that allows efficient searching of the document collection. The index is constructed in a manner that not just includes the terms, but that also retains information about the location of the terms in the converted documents. The newly indexed document information may be stored in its own index, or may be merged with previously indexed document information.

FIG. 8 describes the steps in the classification process. At step 801 a topic classifier is selected. Each topic classifier contains a topic query as well as a topic threshold. The topic query, when processed by a search engine, defines a set of matching documents. In the preferred embodiment a collection of topic classifiers is available and the classification process comprising this steps 801-808, as discussed below, is conducted for each topic classifier. In addition, the preferred embodiment allows the classification process to be applied using a subset of the available classifiers, including using only a single classifier. At step 802 the searcher uses the topic query to identify matching documents. In step 803, the scorer computers a similarity score for each of these matching documents. The similarity score is a measure of how closely the matching document matches the topic query. It is analogous to the relevancy measure provided by some search engines. It is also sometimes referred to as the similarity between the matching document and the query. In the preferred embodiment, the similarity computation is based on a cosine algorithm applied to document term vectors; other embodiments can use other algorithms instead.

At step 804 the matching documents produced in step 803 are sorted by the similarity score, such that the first document has the highest similarity score, and the last document has the lowest similarity score. In the preferred embodiment, the relative index of each document is saved for later processing. By way of explanation, when the documents have been sorted in order of similarity score, the top-scoring document will have an index of 1, the next an index of 2, and so forth.

In step 805 the topic threshold is obtained from the topic classifier selected in step 801 and is used to extract the set of top scoring documents. By way of example, the topic threshold may be expressed as a percentage, so assume the value of the topic threshold is 90%. This means that the top 90% of the matching documents, sorted in descending order of similarity score will be selected. Put another way, the lowest scoring 10% of the matching documents will be discarded. Once the top-scoring documents have been extracted in step 805, they are further screened in step 806 to select the target documents. The target documents are those that have been identified by the document selector. As discussed earlier, in the preferred embodiment, the documents' publication date is the criteria used in the document selector. However, any other characteristic of the documents might alternatively be used.

Figure 3:
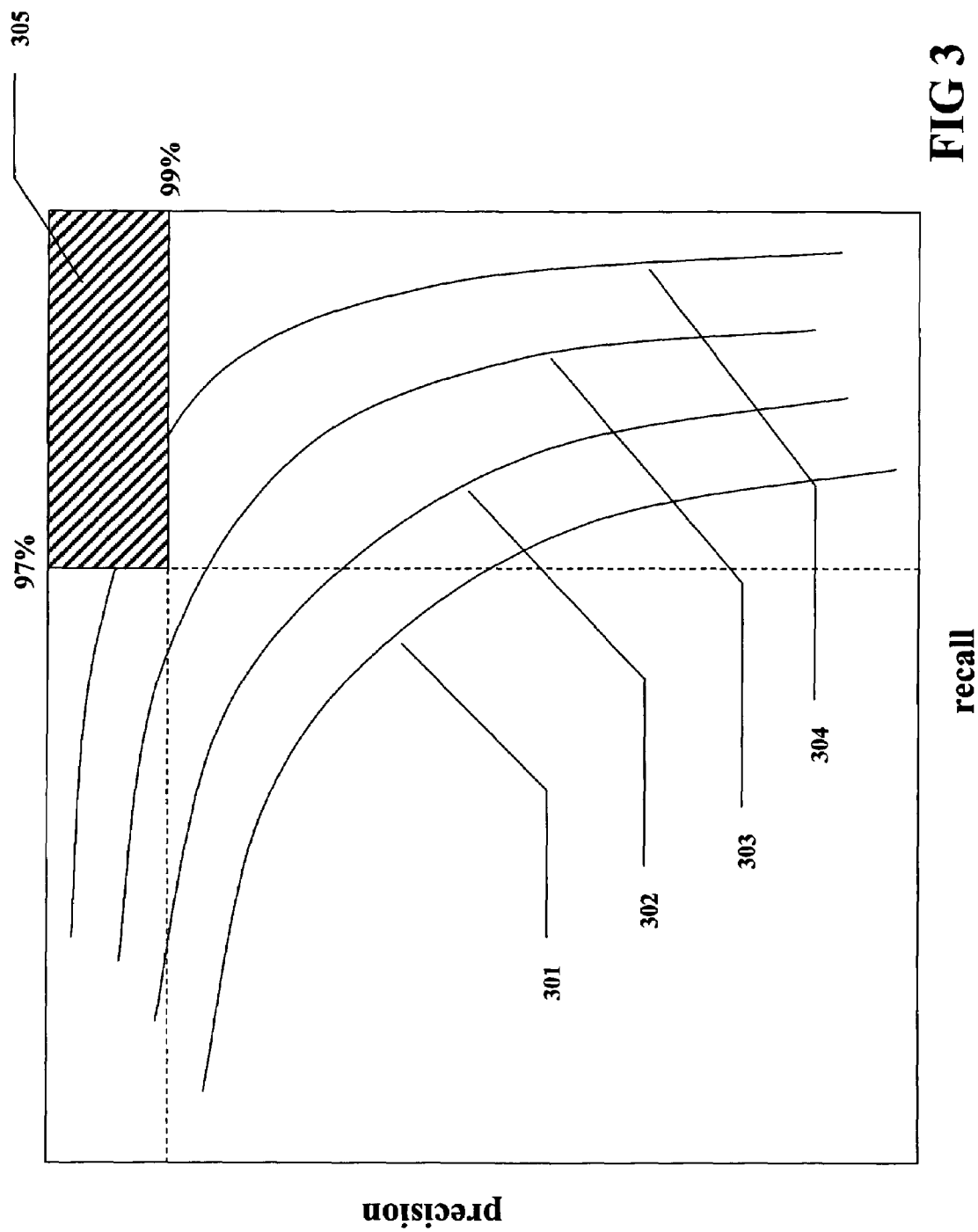
FIG. 3 depicts a set of automatic categorization performance curves for different forms of categorization systems, including the present invention, along with the target precision and recall objectives.

The combined effect of following the rule-based selection of steps 802-804 with the instance-based steps 805-806 is crucial to fully understanding the unique functioning of the present invention. Referring back to the precision-recall curves of FIG. 3, note that the best performance of prior art classifiers 303 is not capable of achieving the target performance 305 deemed necessary for producing the enhanced news products with a level of quality necessary for market success. The effect of step 805 is to significantly raise the classifier's precision, at a cost of a slight reduction in recall. This effect is show as the highest performance curve 304. Note that it is only this high performance curve 304 that intersects the target classification performance region 305. In addition, because the topic threshold is a percentage, as the population of classified documents changes over time, the classifier employing this threshold will remain relatively stable over a much longer time than will an ordinary rule-based classifier without the threshold.

Referring once again to FIG. 8, once the topic scoring documents have been selected, in step 807 the classification parameters for each such document are extracted into a classification record and, in the preferred embodiment, stored in the classification database. These parameters include at a minimum, the identity of the topic and the document, along with the associated similarity score.

In the preferred embodiment, the document rank is also computed and stored. The document rank is computed from the values produced in step 804. By way of example, if there were 200 matching documents, the highest scoring document would have an index of 1, which would be converted to a document rank of 100%. The document with an index of 100 would have a document rank of 50%. The document with an index of 150 would have a document rank of 25%.

In the preferred embodiment, the document rank is used to normalize the similarity scores, as the document similarity scores may tend to cluster tightly around a few values.

In the preferred embodiment, the criterion from the document selector is also stored in the classification record. This provides a simple way to update the classification database, should that be needed. In the preferred embodiment step 807 follows after steps 802-806. It is recognized that in other embodiments step 807 may occur earlier in the sequence of these steps.

Once step 807 has been completed, a determination is made in step 808 as to whether any more topic classifiers need to be applied. If so, processing continues with step 801.

If all the topics have been processed, the enhanced news products are generated as shown in FIG. 9. The most basic product, the set of topic reports, is generated in step 901. The set of topic reports are used in all other products. The processing accesses the classified news articles and for each topic, generates a list of candidate articles. The initial set is based on the presence or absence of a topic identifier in the classification database records. Then the articles with the lowest confidence (via a configurable threshold) are ignored and the rest are integrated via templates to display the articles in a reverse chronological order. The templates used to produce the topic reports also have provisions for inserting additional static content, including links to content residing elsewhere.

The number of topic reports can be quite large, numbering will into the hundreds or more. To assist viewers in navigating through the topic reports, a browsable interface is available, allowing viewers to "drill down" into logical layers to reach the topic reports of interest to them. In addition, the preferred embodiment includes a searchable interface, providing viewers with the capability of entering queries to locate the desired topic reports.

Once the topic reports have been generated in step 901, the other products are also generated. Though the particular order that these other products are generated may vary, the preferred embodiment proceeds with generating and updating the news channels 902. In the preferred embodiment, as each topic report is generated, a separate file (called a RSS file) is also generated. Viewers can subscribe to the RSS file in order to receive updates as they become available. It is understood that other forms of notification, such as generation of e-mail notices, may be employed as well. Collectively, in the preferred embodiment, these notifications are referred to as news channels.

Another type of product is the topic-annotated news report and the topic annotated news story. The process for generating these types of products is shown at step 903. A news report typically takes the form of a home or section page on a news website, and these reports include references to a selected set of the news stories. The topic-annotated news story is one in which links to topic reports are added to the news article, in which the linked-to topic reports correspond to any topics to which the news report has been assigned by the classification process, discussed earlier. In the preferred embodiment, when a news article has been assigned multiple topics, the topic report links are shown in order of their confidence factor, so that the topic report with the highest confidence factor will be shown first.

Just as the topic report links are computed and inserted into the appropriate news article, these links are also inserted next to references to any such news article that may appear in the news reports. Again, in the case of multiple classifications, the order of any shown links will correspond to the associated topic's confidence factor vis-à-vis the news article.

The final type of product, the rolling news summary, is generated in a process shown at step 904. The topics associated with articles published over a specified period of time are aggregated, and a ranking is formed, with the topic having the most articles published over that period becoming the highest ranked topic. The topic with the fewest associated articles published over the same period would be the lowest ranked. References to articles corresponding to the top set of highest-ranking topics are then aggregated and, via appropriate templates, used to generate the rolling news summary. In the preferred embodiment, the period of time is selected to be 7 days, and the top set is selected to be 20. Thus what is provided is a report showing the top twenty topics over the past seven days, with articles associated with each of these top twenty topics listed in reverse chronological order.

CONCLUSIONS, RAMIFICATIONS AND SCOPE

Accordingly, the reader will see that the classification capability provided by this invention can be used to provide associations between documents and topics that are highly accurate and consistent. Furthermore, the present invention has additional advantages in that it provides this accurate and consistent performance in the presence of hundreds of different, often closely-related topics;

it easily accommodates changes in the topics, either from new topics being added, existing topics being merged with other existing topics, existing topics being combined with other existing topics, modification of existing topics, and removal of existing topics;

it avoids a dependency on having sets of pre-classified training documents, and avoids incurring the errors that may have occurred in the original classification of the training documents;

It performs the rule-based classification in a manner that allows the classification features of the rules to be persistent, changing little when new documents are added to an existing classified document repository, such that maintenance is low;

it permits each document may be associated with multiple topics, and in each document-topic association also assigns a factor representing the strength of the association; and, it provides a means to quickly determine the presence of errors and to quickly fix them so subsequent classification actions don't produce the errors.

While the above description contains many specificities, these should not be construed as limitations on the scope of the invention, but as exemplifications of the presented preferred embodiments thereof. Many other ramifications and variations are possible within the teachings of the invention.

Thus the scope of the invention should be determined by the appended claims and their legal equivalents, and not by the examples given.

The invention claimed is:

1. A document categorization method implemented by a computer processor for creating associations between one or more documents with a predefined topic, wherein each said predefined topic comprising:
   a topic name, a topic threshold and a topic query, wherein said topic threshold comprising a percentage value ranging from zero to one hundred, and wherein said topic query comprising one or more terms, each of said terms comprising:
   a word or a phrase, logical and grouping operators that define relationships between said terms, said method comprising:
   identifying matching documents using said topic query;
   screening said matching documents to produce document-topic associations for each of said documents that also match said topic threshold and said topic query, said screening comprising:
   computing a score for each of said matching documents, wherein said score value equals the similarity of each of said document with said topic;
   sorting said matching documents in order of said computed score; and
   selecting a subset of said matching documents wherein said subset being defined by said topic threshold,
   wherein said method implements a bimodal classifier that produces document-topic associations that are consistently accurate in terms of precision and recall over document collections that change over time in size and composition.

2. A computer implemented system for automatically creating associations between one or more documents with a predefined topic, comprising:
   a memory; and
   a processor;
   wherein the predefined topic comprising a topic name, a topic threshold and a topic query, wherein said topic threshold comprising a percentage value ranging from zero to one hundred, and wherein said topic query comprising one or more terms, each of said terms comprising:
   a word or a phrase, logical and grouping operators that define relationships between said terms, said system comprising:
   identifying matching documents using said topic query;
   screening said matching documents to produce document-topic associations for each of said documents that also match said topic threshold and said topic query, said screening comprising:
   computing a score for each of said matching documents, wherein said score value equals the similarity of each of said document with said topic;
   sorting said matching documents in order of said computed score; and
   selecting a subset of said matching documents wherein said subset being defined by said topic threshold,
   wherein said system implements a bimodal classifier that produces document-topic associations that are consistently accurate in terms of precision and recall over document collections that change over time in size and composition.

3. A computer implemented system for creating associations between a set of topics and a set of documents, said system including:
   a classifier for each topic, each said classifier comprising:
      a query expression, each said query expression comprising:
         one or more terms, each said term comprising a word, or a phrase, and,
         logical and grouping operators, said operators defining relationships between said terms;
      a similarity threshold;
   a classification engine, said classification engine comprising:
      a searcher for determining if a specified document matches a specified query expression,
      a scorer for computing the similarity score between each said matching document and said query expression,
      a selector for selecting a proportion of said matching documents as specified by said similarity threshold; and
   storage means for storing the output of said classification engine,
   wherein said system implements a bimodal classifier that produces document-topic associations that are consistently accurate in terms of precision and recall over document collections that change over time in size and composition.

4. A computer-readable medium having computer instructions stored thereon, which, when executed by a processor, causes the processor to perform operations comprising:

creating associations between one or more documents with a predefined topic, wherein said topic comprising:

a topic name, a topic threshold and a topic query, wherein said topic threshold comprising a percentage value ranging from zero to one hundred, and wherein said topic query comprising one or more terms, each of said terms comprising:

a word or a phrase, logical and grouping operators that define relationships between said terms, said operations comprising:

identifying matching documents using said topic query;

screening said matching documents to produce document-topic associations for each of said documents that also match said topic threshold and said topic query, said screening comprising:

computing a score for each of said matching documents, wherein said score value equals the similarity of each of said document with said topic;

sorting said matching documents in order of said computed score; and selecting a subset of said matching documents wherein said subset being defined by said topic threshold, wherein said method implements a bimodal classifier that produces document-topic associations that are consistently accurate in terms of precision and recall over document collections that change over time in size and composition.

\* \* \* \* \*